June 20, 1933.  A. E. SMITH ET AL  1,914,585
TANK HEATING DEVICE
Filed May 20, 1931   3 Sheets-Sheet 1
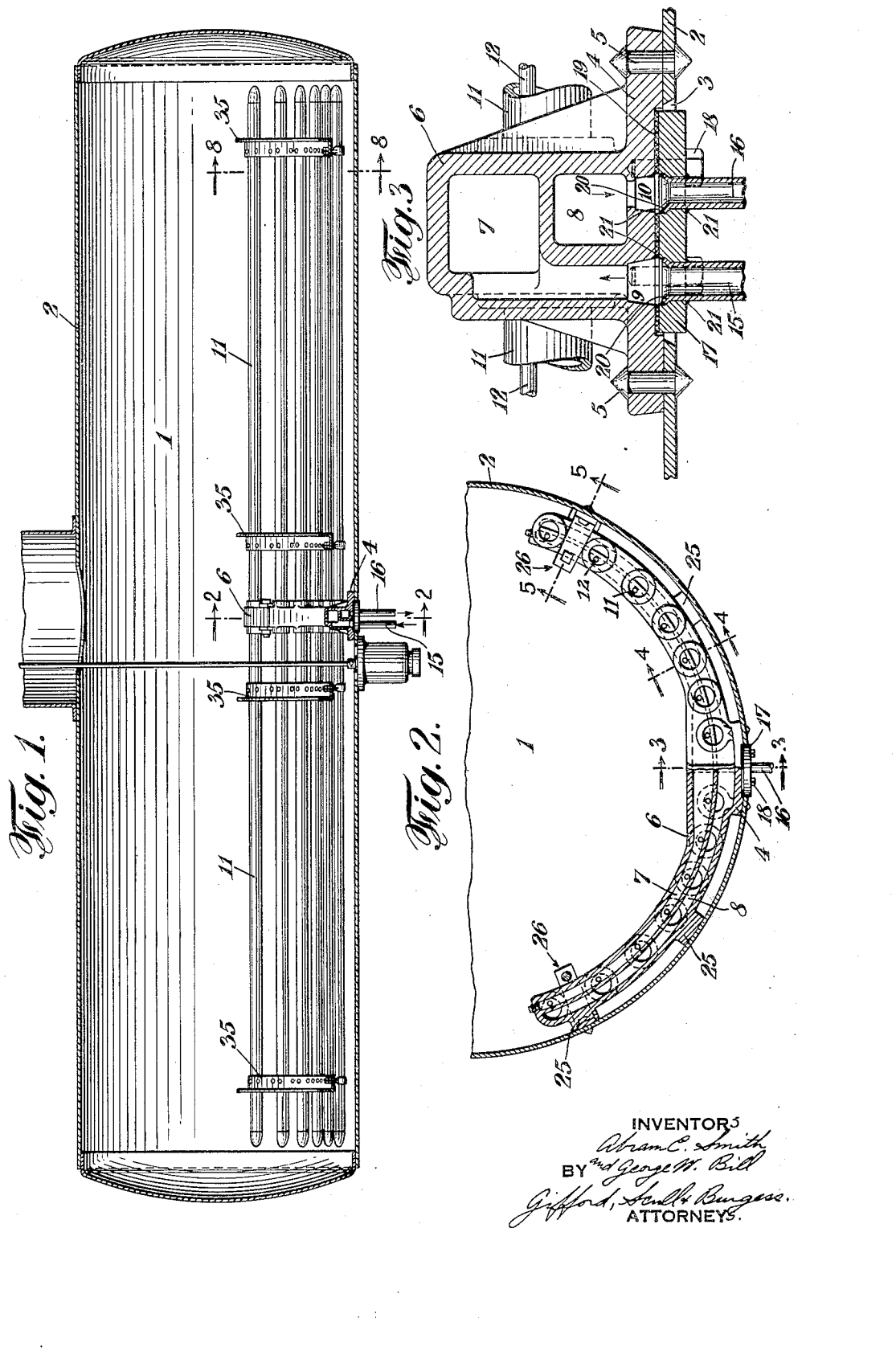
INVENTORS
Abram E. Smith
BY and George W. Bill
Gifford, Scull & Burgess
ATTORNEYS June 20, 1933.   A. E. SMITH ET AL   1,914,585
TANK HEATING DEVICE
Filed May 20, 1931   3 Sheets-Sheet 2
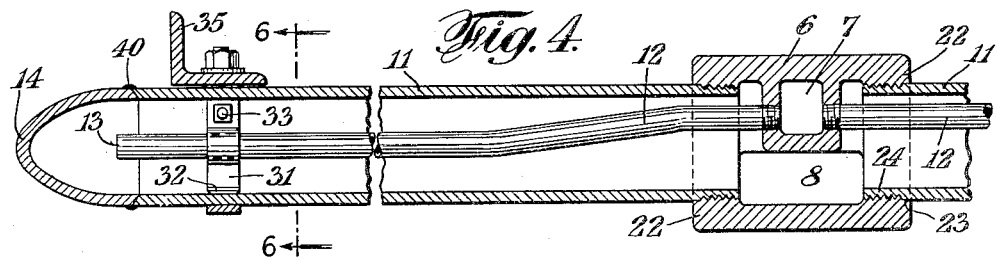
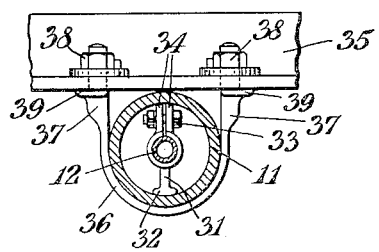
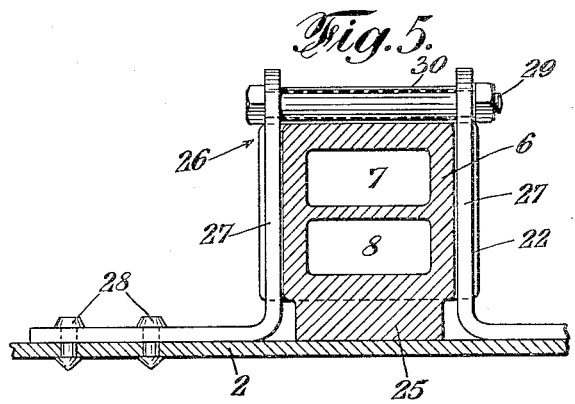
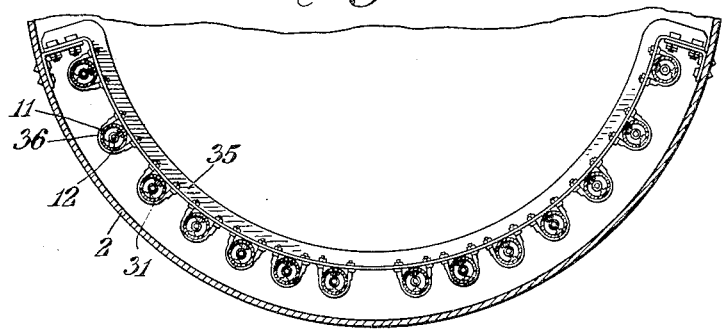
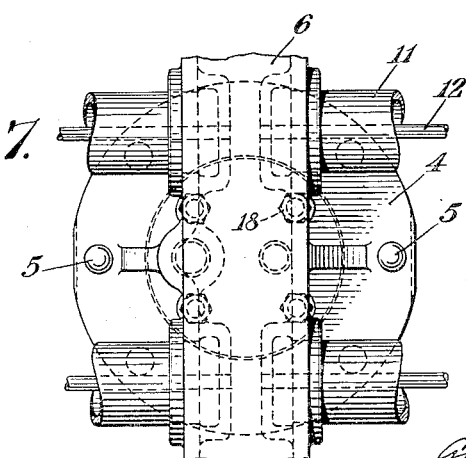
INVENTORS
Abram E. Smith
and George W. Bill
BY Gifford, Scull & Burgess
ATTORNEYS

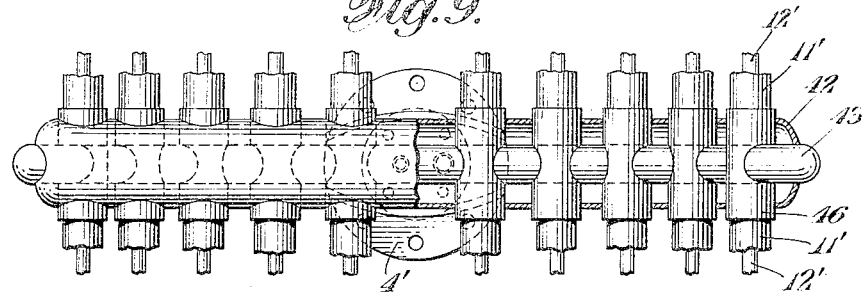
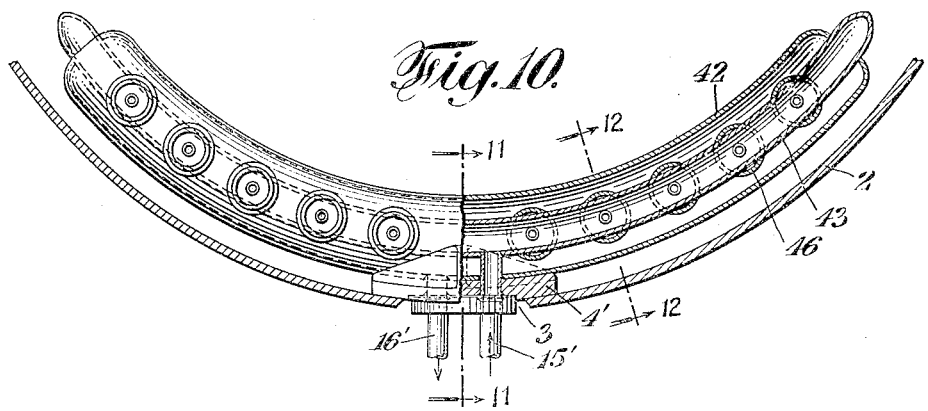
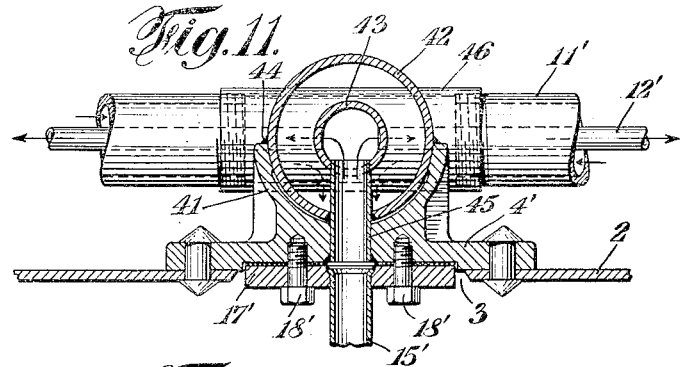
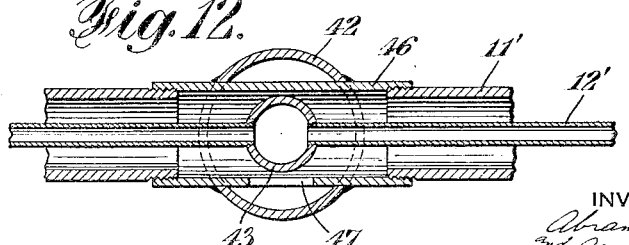

Patented June 20, 1933

1,914,585

UNITED STATES PATENT OFFICE

ABRAM E. SMITH, OF CHICAGO, ILLINOIS, AND GEORGE W. BILL, OF VALPARAISO, INDIANA, ASSIGNORS TO UNION TANK CAR COMPANY, OF CHICAGO, ILLINOIS, A CORPORATION OF NEW JERSEY

TANK HEATING DEVICE

Application filed May 20, 1931. Serial No. 538,748.

This invention relates to a novel and improved form of tank heating device, and more particularly to improvements upon the form of heater disclosed in the patent to J. W. Van Dyke, No. 1,148,730, granted August 3, 1915.

The novel features of the invention will be best understood from the following description and the annexed drawings, in which we have shown selected embodiments of the novel features, and in which:

Fig. 1 is a longitudinal sectional view through a tank having therein a heater embodying certain features claimed herein.

Fig. 2 is a section on the line 2—2 of Fig. 1.

Fig. 3 is a section on the line 3—3 of Fig. 2, but on an enlarged scale.

Fig. 4 is a view on the line 4—4 of Fig. 2, but also on an enlarged scale.

Fig. 5 is a section on the line 5—5 of Fig. 2, also on an enlarged scale.

Fig. 6 is a section on the line 6—6 of Fig. 4.

Fig. 7 is a fragmentary plan view of the structure appearing in Fig. 3.

Fig. 8 is a section on the line 8—8 of Fig. 1.

Fig. 9 is a plan view of the structure appearing in Fig. 10.

Fig. 10 is a view similar to Fig. 2, but showing a different form of heater.

Fig. 11 is a section on the line 11—11 of Fig. 10.

Fig. 12 is a section on the line 12—12 of Fig. 10.

Referring first to Figs. 1 to 7, inclusive, we have shown the invention as disposed within a tank 1 of a type normally employed in a tank car for railroad transportation, although it is to be understood that the invention may be used in any other tank where found suitable. The tank is shown as being one having a cylindrical wall 2 in which is an opening 3 over which is secured a fitting 4. The fitting may be secured to the wall by rivets 5 passing through the wall and through flanges on the fitting.

Extending laterally from the fitting, and preferably integral therewith, is a header 6 which is shown as disposed approximately parallel to the wall 2 which, in this form of tank, means that it is curved substantially on an arc of a circle. The header is provided with two passages or chambers 7 and 8, the chamber 7 being connected to a steam inlet 9, and the chamber 8 being connected to a water outlet 10, the inlet and the outlet being disposed in the fitting in such a position that they will be over the opening 3 in the wall of the tank.

Extending from the header are pipes 11, these pipes being shown as extending substantially the length of the tank, while the header is disposed approximately at the center of the tank so that the two sets of pipes will extend oppositely from the center to points adjacent the ends of the tank. The pipes 11 communicate with the chamber 8 of the header, while within the pipes 11 are other pipes 12 communicating with the chamber 7.

The operation of the device thus far described will be apparent. Steam is admitted at the inlet 9 and passes into the pipes 12. The end 13 of each pipe 12 is spaced from the end 14 of the corresponding pipe 11, so that the steam may be discharged from the pipe 12 into the large pipe 11. It will then give up its heat, which will, in turn, be imparted to the contents of the tank, and become condensed to water. The water will then flow back into the chamber 8 and out through the outlet 10.

We refer to steam as the heating fluid, as this is the most common one for use with tanks of this type which are adapted to contain oil. While we shall refer to steam as a heating agency, and to oil as the fluid to be heated, it is, of course, to be understood that by so doing, we do not intend to limit ourselves in any way.

In order to supply steam to the heating device, and to remove the water of condensation therefrom, it is necessary to have inlet and outlet pipes to which steam hose or water hose, as the case may be, may be connected. According to our invention, we provide such pipes and connect them to the tank in such a way that they will not become loosened when the steam or water hose is connected thereto. The arrangement is best shown in Fig. 3, where we have shown an inlet pipe 15 and an outlet pipe 16 disposed in line respectively with the inlet 9 and the outlet 10.

The pipes 15 and 16 are shown as disposed in holes in a plate 17 detachably secured to the fitting 4 as by machine screws 18. A suitable gasket 19 may be placed between the fitting and the plate. The ends of the pipes 15 and 16 are expanded outwardly as indicated at 20, and may be welded to the wall of the holes in the plate as indicated at 21. By this arrangement, the pipes are securely held in place and, if necessary, may be easily replaced by removing the screws 18, when an entire assembly of pipes and plates may be removed and replaced by another assembly. The pipes may be provided with any usual fitting (not shown), so that other pipes may be coupled thereto. It will be noted that the pipes 15 and 16 are held rigidly in position so that they cannot become loosened by the coupling or uncoupling of other pipes or hose.

Referring now to Fig. 4, we have shown another feature of the invention which is of importance as reducing the possibility of breakage and consequent leakage. It is to be remembered that a tank of this type used in the transportation of oil is subjected to rough usage, both while in movement in a train and also while being shifted in railroad yards and while being coupled and uncoupled. The many jars and sudden strains to which the apparatus is subjected tends to loosen the joints and to break parts which are not adequately supported. One point where trouble has been experienced is at the joint between the header and the pipes connected thereto. The pipes are of considerable length, and even though they may be supported at spaced intervals, nevertheless such supports are not always sufficient to relieve strain at the joint between the pipe and header.

To overcome the above difficulty, we have devised the arrangement shown in Fig. 4, wherein it will be seen that each pipe 11 is received within an opening in the wall 22 of the header. This wall 22 is thicker than the other walls, and has a portion 23 accurately machined to the size of the outer diameter of the pipe 11. The pipe 11 has its outer surface engaging this seat 23, and the end portion 24 of the pipe beyond the seat is threaded and engages corresponding threads of the opening in the wall 22. Of course, the threaded portion of a pipe is relatively weak, and, according to the arrangement just described, the threaded end is relieved of substantially all strain due to a tendency of the pipe to bend or deflect. Any such deflecting tendency is resisted by the firm engagement of the pipe with the accurately machined seat 23, and, therefore, the threads are relieved of substantially all stress, except that for which they are normally designed.

The header itself has likewise been materially improved over prior art practices, and to resist the severe strains to which a structure of this type is subjected. The header is preferably cast integral with the fitting 4 as previously stated, and then extends laterally in a direction circumferentially of the tank or concentric with the tank wall. At spaced intervals, the header is provided with pads or feet 25 engaging the wall 2 of the tank but disconnected therefrom to permit relative movement therebetween, and at suitable intervals the header is securely clamped against the wall so as to hold these feet in contact therewith.

In the illustrated embodiment, we have shown clamps 26 disposed adjacent the ends of the header, although others may be used as desired. By this arrangement, it is possible to materially increase the length of the header, as will be seen from a comparison of Fig. 2 of this application with Fig. 2 of the Van Dyke patent referred to above. This increase in length of header, of course, makes it possible to increase the amount of heating surface in the heating device.

In Fig. 5 is shown a detail view of the clamp, and it will be seen that this comprises two straps 27 having vertical legs extending on opposite sides of the header, and horizontal legs secured to the wall as by rivets 28. The straps may conveniently be disposed between the thickened walls 22 for the pipes 11, and we have shown them as being disposed at the same point as one of the feet 25.

Extending through the upper ends of the straps is a bolt 29 having thereon a thimble 30 which prevents any outward movement of the header away from the wall of the tank. Preferably, the thimble is spaced away from the top of the header a sufficient distance to permit free expansion and contraction, without fear of binding. The thimble acts primarily as a spacer between the straps 27 to hold them apart and prevent their binding the header between them.

Another feature of importance is the spacing mechanism, best shown in Figs. 4 and 6. As shown, the pipes 12 have the major portions of their lengths disposed substantially concentrically with the pipes 11. In order to support the pipe 12 and prevent its vibration, we have supplied each pipe 12 with one or more spacers 31. These spacers may have a foot 32 engaging one side of the pipe 11, and may have the other leg split, as shown, with the two parts united by a bolt 33, whereby the spacer may be clamped on the pipe 12. The overall dimension of the spacer is slightly less than the inside diameter of the pipe 11 so as to permit longitudinal movement of the spacer, but any substantial transverse movement of one pipe relative to the other is prevented by the foot 32 and the foot formed by the two ends 34 of the split part of the spacer.

The pipes 11 may be supported at spaced intervals along their lengths, the supports here being shown as structural members in the form of angles 35, and the pipes 11 are secured thereto by means of U-bolts 36. The structural members are preferably spaced inwardly from the wall 2, and preferably support the pipes between the wall and the members. The form of U-bolt is best shown in Fig. 6, wherein it will be seen that it has two parallel legs 37 passing through holes in the structural member, and threaded to receive nuts 38.

The legs 37 are provided with shoulders 39 which engage the structural member and positively limit the amount of tightening which can be done by the nuts 38. The shoulders are so disposed that tightening of the nuts cannot bring the pipe 11 into contact with the member 35. To do so would resist normal expansion and contraction of the pipe 11, whereas, with the arrangement just described, such expansion and contraction can take place and there is no danger of its being prevented by unskilled labor in tightening the bolts.

As best shown in Fig. 4, the end of each pipe 11 is rounded or curved, and the apex of the curve is in line with the end 13 of the pipe 12, so that steam discharged from the pipe will strike in the vicinity of the apex and be deflected back along the inner surface of the pipe 11. The form of the curve at the end of the pipe 11 is such that the curve is a smooth one substantially tangent to the inner surface of the pipe 11 and such that the steam will flow in contact with the wall as it returns towards the header. The end is preferably formed of a forging, and while this forging may be an integral part of the pipe, we have shown it as a separate cap formed independently of the pipe and secured thereto as by welding, the welding being indicated at 40.

Referring now to Figs. 9, 10, 11, and 12, we have shown therein a different form of heating device which may be used with the same type of tank previously described. In this form, the tank wall 2 is provided with the opening 3 as before, and a fitting 4' is provided to cover the opening and to receive a plate 17' secured thereto by screws 18'. Inlet and outlet pipes 15' and 16' are secured to the plate as before.

The fitting is provided with a saddle 41 in which is disposed a header. In this form, the header consists of an outer tube 42 and an inner tube 43. The outer tube may be welded to the saddle as indicated at 44, and is provided with a hole through which passes a tube 45 in line with the inlet pipe 15'. The tube 45 is threaded or otherwise secured in an opening in the tube 43 so that steam may flow directly into the tube 43 from the inlet.

Extending transversely through the tube 42 are short sections 46, also of tubing. These sections pass through holes in the tube 42, and, in turn, are provided with holes through which passes the tube 43. The joints between the tubes at these various holes may be made tight by welding.

Secured to each of the sections 46 are the pipes 11', and inside of these pipes are the pipes 12' which extend into the tube 43. The sections 46 are provided with openings 47 disposed within the tube 42, so that the water of condensation may drain into the tube 42.

The operation of this form of invention will be easily understood, and will not be described in detail. The construction forms one made entirely from forgings, more particularly from tubing, and consequently of increasing strength over prior art constuctions.

While we have shown the invention as embodied in a specific form, it is to be understood that various changes in details may be made without departing from the scope of the invention, and we therefore do not intend to limit ourselves except by the appended claims.

We claim:

1. A tank heating device comprising a header having an inlet for steam and an outlet for water, a plate secured to said header and having holes in alignment with said inlet and outlet, pipes disposed in said holes and welded in place therein, and means to secure said header on the inside of the tank with said plate and pipes disposed in an opening in the wall of the tank.

2. A tank heating device comprising a header having an inlet for steam and an outlet for water, a plate secured to said header and having holes in alignment with said inlet and outlet, pipes expanded into said holes, and means to secure said header on the inside of the tank with said plate and pipes disposed in an opening in the wall of the tank.

3. A tank heating device comprising a header having an inlet for steam and an outlet for water, a plate detachably secured to said header and having holes in alignment with said inlet and outlet, pipes disposed in said holes and welded in place therein, and means to secure said header on the inside of the tank with said plate and pipes disposed in an opening in the wall of the tank.

4. In combination, a tank adapted to contain a fluid, a heating device in the tank and comprising an elongated header, said header having an inlet for steam and an outlet for water, pipes extending from said header and through which steam may circulate, means adjacent the inlet and outlet for supporting the header on the tank wall, and feet spaced along said header and engaging the wall but disconnected therefrom to hold the header in proper spaced relation thereto.

5. In combination, a tank adapted to contain a fluid, a heating device in the tank and comprising an elongated header, said header having an inlet for steam and an outlet for water, pipes extending from said header and through which steam may circulate, means adjacent the inlet and outlet for supporting the header on the tank wall, feet spaced along said header and engaging the wall but disconnected therefrom to hold the header in proper spaced relation thereto, and means holding the header against movement away from the wall.

6. In combination, a tank adapted to contain a fluid to be heated, a header within the tank and disposed adjacent the wall thereof, straps secured to the wall of the tank and extending therefrom on opposite sides of the header, and a bolt passing through the ends of said straps and preventing substantial movement of the header away from the wall of the tank.

7. In combination, a tank adapted to contain a fluid to be heated, a header within the tank and disposed adjacent the wall thereof, straps secured to the wall of the tank and extending therefrom on opposite sides of the header, a bolt passing through the ends of said straps and preventing substantial movement of the header away from the wall of the tank, and a spacer associated with the bolt and holding the straps apart.

8. In combination, a tank adapted to contain a fluid to be heated, a header within the tank and disposed adjacent the wall thereof, and means holding the header throughout its length against substantial movement transversely of its length, while leaving it free to expand and contract longitudinally.

9. In combination, a tank adapted to hold fluid to be heated, heating pipes disposed in said tank, a support for said pipes comprising a structural member, and U-bolts embracing the pipes and having legs passing through holes in said member, said legs having shoulders thereon so disposed as to prevent tightening of the bolts and binding of the tubes against the member.

10. A tank heating device comprising a fitting secured to the wall of the tank, a header secured to said fitting and formed of concentric tubes, an inlet for steam passing through said fitting and through the outer tube into the inner tube, an outlet for water passing through the fitting and connected to the outer tube, and concentric pipes extending from the header with the inner pipes passing through the outer tube and connected to the inner tube, and the outer pipes connected to the outer tube.

11. A tank heating device comprising a fitting secured to the wall of the tank, a header secured to said fitting and formed of concentric tubes, an inlet for steam passing through said fitting and through the outer tube into the inner tube, an outlet for water passing through the fitting and connected to the outer tube, concentric pipes extending from the header with the inner pipes passing through the outer tube and connected to the inner tube and the outer pipes connected to the outer tube, said outer pipes having sections extending through the outer tube, and an inner tube passing through the sections within the outer tubes.

12. A tank heating device comprising two pipes, one disposed within the other, means for passing steam through said pipes, a spacer on said inner pipe and contacting with the inner surface of the outer pipe, and means for detachably clamping said spacer on said inner pipe in any desired position thereon.

13. A tank heating device comprising two pipes, one disposed within the other, means for passing steam through said pipes, a spacer on said inner pipe and contacting with the inner surface of the outer pipe, said spacer having parts extending on opposite sides of the inner pipe, and a bolt securing said parts together to clamp the spacer in desired position.

ABRAM E. SMITH.
GEORGE W. BILL.